United States Patent
Sabo et al.

(10) Patent No.: US 7,082,313 B2
(45) Date of Patent: Jul. 25, 2006

(54) SECURE SHORT MESSAGE SERVICE

(75) Inventors: Yitzhak Sabo, Misgav (IL); Uri Benchetrit, Haifa (IL); Philip Alper, Misgav (IL)

(73) Assignee: Qualcomm Incorporated, San Diego, CA (US)

( * ) Notice: Subject to any disclaimer, the term of this patent is extended or adjusted under 35 U.S.C. 154(b) by 469 days.

(21) Appl. No.: 10/252,759

(22) Filed: Sep. 23, 2002

(65) Prior Publication Data

US 2003/0096626 A1   May 22, 2003

Related U.S. Application Data

(60) Provisional application No. 60/393,454, filed on Jul. 2, 2002, provisional application No. 60/326,638, filed on Sep. 24, 2001.

(51) Int. Cl.
*H04Q 7/20* (2006.01)
*H04M 1/66* (2006.01)
*H04M 1/68* (2006.01)
*H04M 3/16* (2006.01)

(52) U.S. Cl. ............... 455/466; 455/410; 455/411

(58) Field of Classification Search ............... 455/466, 455/411, 410, 412.1; 380/121, 149; 705/44; 379/100.09
See application file for complete search history.

(56) References Cited

U.S. PATENT DOCUMENTS

| 5,245,657 | A  | * | 9/1993  | Sakurai ................. 705/67 |
| 5,781,632 | A  | * | 7/1998  | Odom ..................... 705/78 |
| 5,822,700 | A  | * | 10/1998 | Hult et al. ............. 455/466 |
| 5,937,355 | A  | * | 8/1999  | Joong et al. ........... 455/466 |
| 5,950,123 | A  | * | 9/1999  | Schwelb et al. ....... 455/414.4 |
| 6,151,507 | A  | * | 11/2000 | Laiho et al. ........... 455/466 |
| 6,292,669 | B1 | * | 9/2001  | Meuronen et al. ..... 455/466 |
| 6,400,942 | B1 | * | 6/2002  | Hansson et al. ....... 455/426.1 |
| 6,580,917 | B1 | * | 6/2003  | Lefevre et al. ........ 455/466 |
| 6,795,711 | B1 | * | 9/2004  | Sivula .................. 455/466 |

* cited by examiner

*Primary Examiner*—George Eng
*Assistant Examiner*—Wesley Kim
(74) *Attorney, Agent, or Firm*—Philip Wadsworth; Bruce W. Greenhaus; Andrea L. Mays

(57) ABSTRACT

A method for sending a secure message within a communications network which operates a short message service (SMS) according to an SMS protocol. The method consists of transmitting an SMS message of a predefined type from a mobile transceiver over the network, receiving the SMS message at an SMS receiver, and transmitting an authorization request, responsive to the SMS message and the predefined type, from the SMS receiver to the mobile transceiver. The method further includes receiving the authorization request at the mobile transceiver, transmitting a pre-determined confirmation code from the mobile transceiver responsive to the authorization request, and forwarding the SMS message from the SMS receiver to a message destination responsive to receipt of the confirmation code at the SMS receiver.

46 Claims, 3 Drawing Sheets

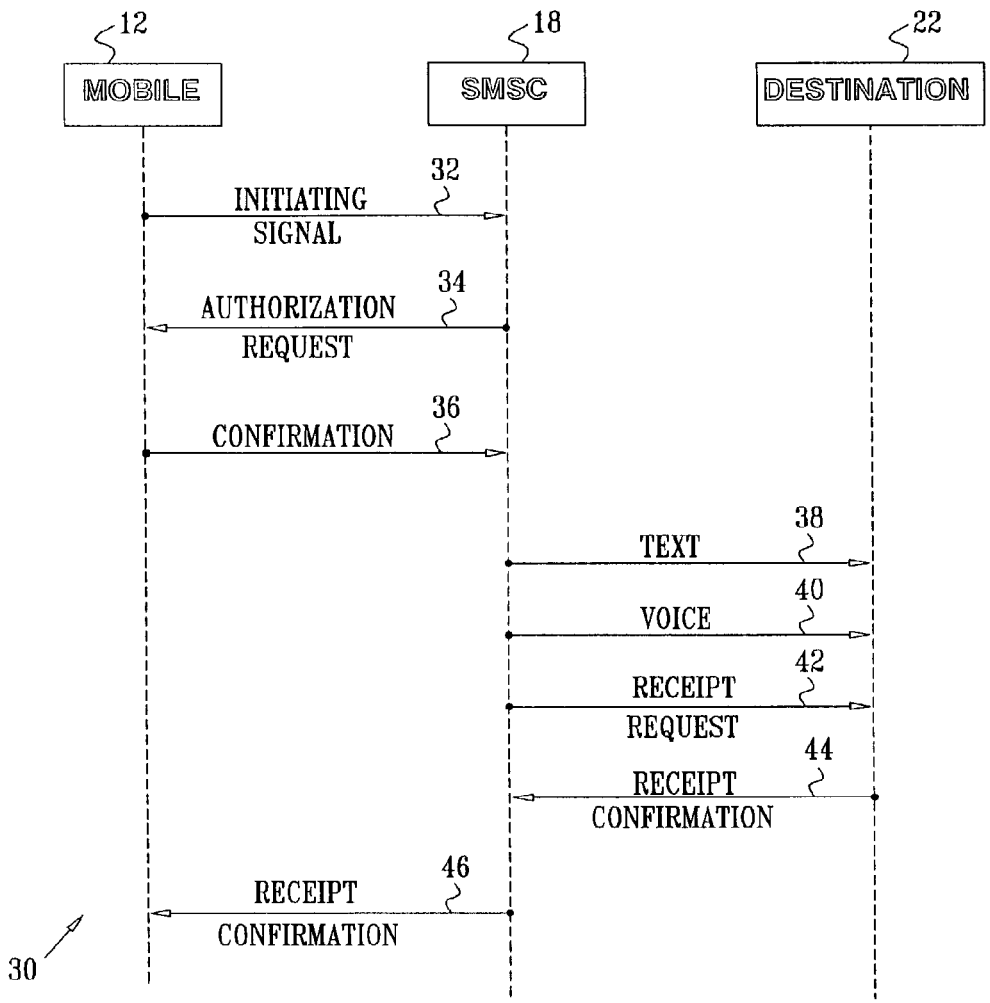
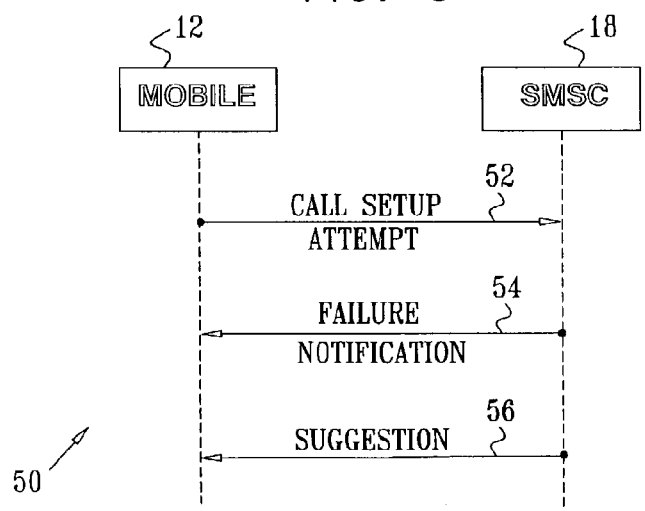

SECURE SHORT MESSAGE SERVICE

RELATED APPLICATIONS

This application claims priority to U.S. Provisional Patent Application No. 60/326,638, filed on Sep. 24, 2001, and U.S. Provisional Application No. 60/393,454 filed on Jul. 2, 2002.

FIELD OF THE INVENTION

The present invention relates generally to transmission of messages, and specifically to transmission of messages over a communication network.

BACKGROUND OF THE INVENTION

Short message services (SMSs) deliver short text messages to mobile transceivers operating in a communication network, and a service is implemented in the network according to an industry-standard SMS protocol. An SMS message typically consists of a relatively small number of alphanumeric characters, and a mobile transceiver operating in such a network may be implemented to receive and/or transmit SMS messages. SMS messages may also be transmitted to the mobile transceiver in other ways, for example, by generating the SMS message on a computer terminal coupled to the Internet. The message is then forwarded to a central SMS service center (SMSC), coupled through a network backbone to a mobile switching center of the network, via the Internet. The SMSC then transmits the SMS message to the mobile transceiver.

The communication network supports both SMS and voice communication. In attempting to set up a voice communication, a user initially makes use of common air channels and computing resources at the BTS to negotiate a required call configuration. Once the voice communication is implemented, dedicated air channels are allocated to the user for the duration of the call. In contrast to voice communication within the network, an SMS message transmission places considerably fewer demands on the network. By its very nature, channel bandwidth for an SMS message is considerably smaller than dedicated traffic channel bandwidth used by a voice communication; the amount of processing and number of resources used by the BTS are less than those used for the dedicated traffic channel; and time of transmission of the SMS message is considerably shorter than time for a typical voice communication. Typically, an SMS message may be transmitted using common and/or dedicated channels.

If the communication network operates under a code division multiple access (CDMA) protocol such as the CDMA2000 protocol, published as TIA/EIA/IS-2000.5-A-1 by the Telecommunications Industry Association, Arlington, Va., SMS messages are transmitted as data burst messages (DBM) having a pre-defined code.

Because of the less demanding nature of SMS messages, in times of high overall network demand an SMS transmission may have considerably more chance of being processed than a voice transmission, since dedicated traffic channels used for the voice transmission may become overloaded while common channels are still available. Such times may be caused by natural events such as earthquakes or floods, or by a man-made event such as a terrorist attack.

However, while SMS messages inherently place less demand on network resources than voice transmissions, SMS messages are less secure than even an unsecured voice transmission. A recipient of an unsecured voice transmission is able to judge from the sound if the voice transmission is genuine; a recipient of an SMS transmission is not able to form such a judgment. In times of high overall network demand, the possibility of an incorrect or inadvertent SMS message rises. Thus, a method for upgrading the security and veracity of SMS transmissions is required.

SUMMARY OF THE INVENTION

It is an object of some aspects of the present invention to provide a method and apparatus for transmitting a short message service (SMS) message securely.

In preferred embodiments of the present invention, a mobile transceiver operates in a communication network, most preferably a cellular communication network. The mobile transceiver is configured to transmit SMS messages to an SMS service center (SMSC) in the network, the SMSC being coupled to a mobile switching center of the network via a backbone of the network. Most preferably, the SMS messages are transmitted using common channels of the communication network. The SMS messages transmitted by the mobile transceiver may be sub-divided into two types: regular and secure SMS messages. A regular SMS message comprises an SMS message which the network can transmit according to an industry-standard protocol under which the network is operating. A secure SMS message consists of a regular SMS message which also generates an authorization in the SMSC. The SMSC transmits the authorization to the mobile transceiver on receipt of the secure SMS message.

After receipt of the authorization at the mobile transceiver, a user of the mobile transceiver may transmit a confirmation to the SMSC, verifying that the SMS message is valid. The SMSC waits for the confirmation after transmission of the authorization. When the SMSC receives the confirmation code, the service center forwards the verified SMS message to its final destination. Providing the capability to transfer secure SMS messages by confirming that the SMS message is valid significantly enhances the capabilities of the mobile transceiver.

Alternatively, the SMSC, or an operator thereof, may transmit the SMS message as an unverified message, in which case the final destination is most preferably informed that the SMS message is unverified.

If the final destination of the secured SMS message is not capable of receiving an SMS message, such as if the final destination comprises a landline telephone, a session initiation protocol (SIP) capable phone, a computer terminal coupled to the Internet, or a facsimile machine, the secured SMS message is preferably translated to a form suited to the final destination.

For example, in the case of the landline telephone, the translation is preferably to speech in a text-to-speech converter associated with the SMSC. The converter is preferably invoked by the operator of the SMSC, and the speech is conveyed to the final destination. In the case of other final destinations, such as those exemplified above, the SMSC most preferably utilizes a respective translation protocol to convey the SMS message to the final destination.

In some preferred embodiments of the present invention, after the secured SMS message has been conveyed to the final destination, the latter may generate and transmit a message receipt confirmation. The message receipt confirmation is received by the SMSC, which conveys the confirmation to the mobile transceiver as an SMS message. (Depending on the type of final destination transmitting the confirmation, the SMSC translates the message receipt confirmation to the SMS message.)

In some preferred embodiments of the present invention, a regular SMS message may be transmitted automatically by the SMSC on behalf of a user of the mobile transceiver. For example, if the operator detects that one or more regular voice calls have been attempted by the mobile transceiver, but have failed to be established, the operator may transmit a predetermined regular SMS message on behalf of the user. (It is assumed that the user has chosen to subscribe to this sort of automated message service.) This feature of the present invention is particularly useful, for example, in emergency and disaster situations, in which the cellular network is overloaded with voice calls of users trying to reach their family members and friends. Alternatively or additionally, the operator may transmit a suggestion to the mobile transceiver user to send a secure SMS message.

In some preferred embodiments of the present invention, a regular SMS message may be transmitted automatically by the SMSC to the mobile transceiver. For example, a caller may have attempted one or more regular voice calls to the mobile transceiver, but the calls failed. The failures are detected by the operator of the SMSC, who suggests transmitting an SMS message instead of the voice call. The caller may transmit the SMS message directly, or the operator may transmit the SMS message on behalf of the caller.

The present invention will be more fully understood from the following detailed description of the preferred embodiments thereof, taken together with the drawings, in which:

BRIEF DESCRIPTION OF THE DRAWINGS

FIG. 2 is a sequence diagram showing steps involved in transmitting a secure SMS message, according to a preferred embodiment of the present invention;

FIG. 3 is a sequence diagram showing steps involved in preparation for transmitting an SMS message, according to a preferred embodiment of the present invention.

DETAILED DESCRIPTION OF PREFERRED EMBODIMENTS

Figure 1:
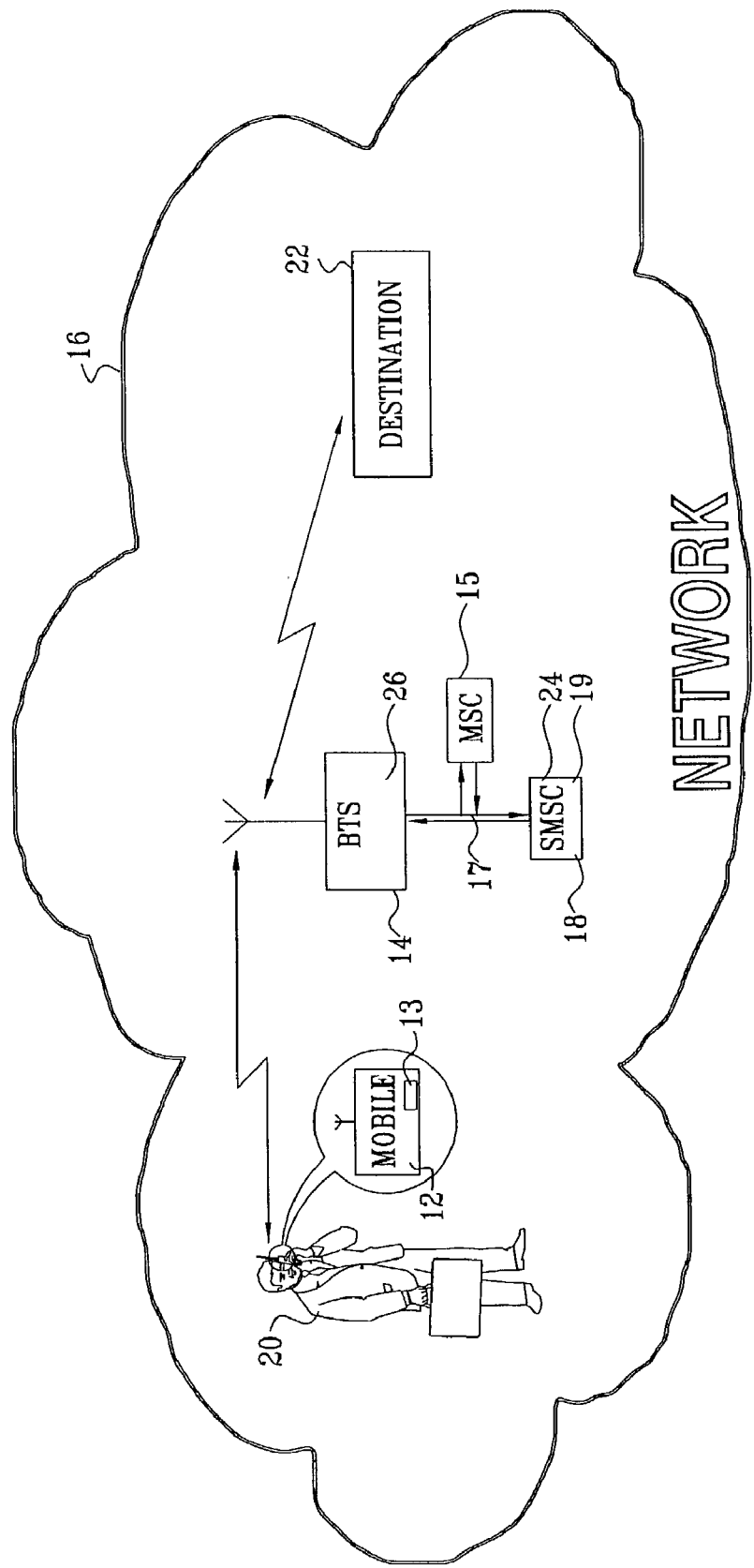
FIG. 1 is a schematic illustration of a secure short message service (SMS) system, according to a preferred embodiment of the present invention.

Reference is now made to FIG. 1, which is a schematic illustration of a secure short message service (SMS) system 10, according to a preferred embodiment of the present invention. System 10 comprises a mobile transceiver 12, operated by a user 20, which is able to communicate with a base-station transceiver system (BTS) 14. Transceiver 12 and BTS 14 are comprised in a communication network 16, most preferably a cellular communication network operating according to an industry-standard protocol such as a code division multiple access (CDMA) protocol. BTS 14 is coupled to an SMS service center (SMSC) 18 via a network backbone 17 comprising a mobile switching center 15. SMSC 18 is able to receive and transmit messages according to an SMS protocol operative in network 16, by methods which are well known in the communication network art.

Transceiver 12 and SMSC 18 are implemented so that the transceiver is able to receive and transmit SMS messages. Transceiver 12 is implemented to transmit the SMS messages as one of two types, regular SMS messages and secure SMS messages. A regular SMS message comprises a message transmitted according to the SMS protocol operative in network 16. A secure SMS message consists of a regular SMS message which is conveyed to its final destination by the SMSC preferably after a confirmation and verification procedure, described below, has been implemented by the user of the transceiver originating the secure SMS message; alternatively, instead of performing the confirmation and verification procedure, an operator of the SMSC may intervene to convey the SMS message. Most preferably, in the case of the operator intervention described above, a notice is appended to the message saying that the message is unverified and should be regarded as such. Both regular and secure SMS messages are conveyed to a final destination 22 by SMSC 18 and BTS 14. Preferably, destination 22 comprises a mobile transceiver which is able to receive regular SMS messages. Alternatively, destination 22 comprises a receiving device, such as a landline telephone, which is able to receive a communication such as voice communication transmitted by BTS 14. Further alternatively, destination 22 comprises at least one of a session initiation protocol (SIP) capable phone, a computer terminal coupled to the Internet, or a facsimile machine, and SMSC 18 comprises respective translation protocols for transmitting to these destinations.

SMSC 18 is most preferably implemented by coupling one or more "secure-SMS" components 19 to a "traditional" SMSC, i.e., an SMSC that is unable to support the confirmation and verification procedure. The secure-SMS components enable the traditional SMSC to support the confirmation and verification procedures described below, while remaining substantially unmodified. Alternatively, SMSC 18 may be implemented by any other method known in the art.

FIG. 2 is a sequence diagram 30 showing steps involved in transmitting a secure SMS message, according to a preferred embodiment of the present invention. Steps illustrated in sequence diagram 30 occur when mobile transceiver 12 communicates with SMSC 18, which in turn communicates with final destination 22 of the message. In a first step, transceiver 12 transmits an initiating signal 32 to SMSC 18. The initiating signal preferably comprises a text message composed by user 20 or a message which has been pre-stored by user 20 in a memory 13 of transceiver 12, together with a predetermined code which indicates to SMSC 18 that initiating signal 32 is the first step in transmission of the secure SMS message. The initiating signal also comprises a telephone number of destination 22.

Alternatively, the initiating signal consists of the predetermined code only, and a predefined message which has previously been stored by user 20 in SMSC 18 is used as the text for the secure SMS message. It will be appreciated that more than one pre-determined code, any one of which is recognized as the initiating signal, may be used, each pre-determined code selecting a different predefined message. When the initiating signal consists of the pre-determined code only, the code also incorporates the telephone number of destination 22, which is stored by user 20 together with the predefined message corresponding to the code.

In a second step, SMSC 18 transmits an authorization request 34, after having received initiating signal 32, and having confirmed that the initiating signal is in a form that has been pre-defined at the SMSC for transferring secure SMS messages. Authorization request 34 is received by transceiver 12, and causes the transceiver to emit a confirmation signal to user 12, indicating that initiating signal 32 has been received at SMSC 18. The confirmation signal may be a visible signal such as an indication on a graphic display of transceiver 12, an auditory signal such as a beep generated by the transceiver, or a tactile signal such as a vibration of the transceiver, or a combination of such sensory signals.

In a third step, after receipt of authorization 34 by transceiver 12, user 20 enters a predetermined confirmation code into the transceiver, and transmits the confirmation code as a confirmation signal 36 to SMSC 18. The predetermined code has been stored in SMSC 18, preferably by user 20, before transmission of initiating signal 32. SMSC 18 receives confirmation signal 36, and verifies that it corresponds with the pre-stored confirmation code. After verification, SMSC 18 conveys the secure SMS message to destination 22, as described below.

Alternatively, rather than performing the second step and/or the third step, SMSC 18 or the operator of the SMSC may continue directly to a fourth step wherein the message of signal 32 is conveyed onwards. (The fourth and subsequent steps are described in more detail below.) For example, after performing the second step, the operator of the SMSC may wait a pre-set time for confirmation signal 36; if the signal does not arrive within the pre-set time, the operator may nonetheless continue to the fourth step. Alternatively, after receiving initiating signal 32 in the first step, the operator of the SMSC may proceed directly to the fourth step.

Particularly in times of network congestion, such as occur during emergency situations like a terrorist attack, it will be appreciated that user 20 may be able to accomplish the first and third steps with relatively few keystrokes of transceiver 12. In such a situation, the relatively few keystrokes provide an efficient and effective communication method for user 20 to let a concerned relative or friend know the user's state. For example, the pre-determined code used in the first step may invoke a message "I am well," and receipt of such a message will allay the recipient's concern for user 20. It will also be appreciated that, unlike "911" calls which require communication between an operator and a caller, transmissions made by user 20 may substantially be made on a "send and forget" basis, since a complete transmission, including confirmation, may be performed just using keystrokes.

If destination 22 comprises a device which is able to receive the secure SMS message "as is," i.e., in the form of a text message, then in a fourth step SMSC 18 may transmit the message as a text message 38 without further operation on the secure SMS message. Alternatively or additionally, SMSC 18 translates the secure SMS message to a voice message, using a text-to-speech translator 24 comprised in the SMSC, and transmits text message 38 as a voice message 40. It will be appreciated that if destination 22 is not a device able to receive text messages, for example if destination 22 comprises a landline telephone, then the fourth step comprises transmission of voice message 40.

The determination of how to transmit the secure SMS message from SMSC 18 may be made automatically, for example, if the SMSC and/or BTS 14 is able to determine characteristics of destination 22. Alternatively or additionally, the determination of how to transmit the secure SMS message may be made by the operator of SMSC 18. Most preferably, the operator monitors incoming secure SMS messages, as each confirmation signal 36 is received, and determines on the basis of the telephone number of destination 22 how each secure message is to be transmitted.

If the second step and/or the third step have not been performed, so that the secure message has not been verified, then, most preferably, in the fourth step an indication that the message is unverified is appended to the message. The indication may take the form of a voice message added to voice message 40 and/or a text message added to text message 38.

In some preferred embodiments of the present invention, in a fifth step a request for receipt of the secure SMS message is transmitted, as a receipt request signal 42, together with signal 38 and/or signal 40. The receipt request signal is preferably appended to signal 38 as an automatic text message, and to signal 40 as an automatic voice message. Receipt request signal 42 may be transmitted by the operator of SMSC 18. Alternatively, initialization signal 32 comprises instructions that receipt request signal 42 is sent with signal 38 or signal 40.

On receipt of receipt request signal 42, in a sixth step a user of destination 22 transmits a confirmation of receipt signal 44, most preferably as a dual tone multi-frequency (DTMF) signal, according to the request for receipt in signal 42. For example, request for receipt signal 42 may append a request to the secure SMS message that the user of destination 22 transmits "99#" as signal 44 to indicate successful reception of the message.

SMSC 18 receives confirmation of receipt signal 44, and translates the signal to a confirmation signal 46 which is sent to transceiver 12. The translation is preferably via a DTMF-to-text translator 26 comprised in BTS 14. Alternatively or additionally, the translation is to some other form receivable by transceiver 12, such as a predetermined audio signal.

FIG. 3 is a sequence diagram 50 showing steps involved in preparation for transmitting an SMS message, according to a preferred embodiment of the present invention. Diagram 50 illustrates steps taken before the steps described with reference to FIG. 2 are implemented. In a first step, transceiver 12 attempts in a call setup attempt signal 52 to establish a regular voice call, according to the protocol operative in network 16. In a second step, SMSC 18 sends transceiver 12 a notification signal 54 that the call set up has failed. In a third step, the operator monitoring SMSC 18 sends a suggestion signal 56 to transceiver 12, suggesting that user 20 sends an SMS message. The suggestion may take the form of a preset voice or text message to transceiver 12. User 20 preferably then sends a secure SMS message, as described with reference to FIG. 2 above. Alternatively, user 20 may send a regular SMS message. Further alternatively, in the third step the operator may send a predetermined SMS message on behalf of the user, providing that criteria previously stipulated by the user in a service agreement with an operator of network 16 have been met.

Particularly when there is a heavy demand on voice channels of network 16, it will be appreciated that secure SMS messages will have a much greater likelihood of successful transmission if they are sent via common channels, rather than dedicated channels. For example, if network 16 comprises a CDMA network, secure SMS messages are preferably sent from transceiver 12 using a reverse control channel (RCCH), and messages from BTS 14 are preferably sent using a forward control channel (FCCH). Most preferably, if network 16 comprises a CDMA network, secure SMS messages are transmitted on the common channels as Data Burst Messages (DBMs) with a dedicated code which has been specifically allocated for secure SMS messages.

It will also be appreciated that, especially in times of emergency or network congestion, an operator of network 16 may change the balance between common and dedicated channels, so that SMS messages as described herein have a greater probability of successful transmission.

If mobile transceiver 12 is operative in a cellular communications network, a location of the mobile may be determined by BTS 14 as soon as a transmission from the transceiver is received by the BTS, by methods known in the art. The location of transceiver 12 may be appended to any SMS message sent from the transceiver, either automatically or via intervention of the operator of SMSC 18. Similarly, a time at which the message was sent may be appended.

Communication networks typically experience heavy demand on voice channels in emergency or disaster situations, with users attempting to contact, or be contacted by, relatives or friends. The heavy demand, at the minimum, causes long delays in any specific voice call being successfully negotiated. In many cases the heavy demand may substantially "crash" the network. Particularly in these types of situations, the contact that is substantially being attempted is relatively straightforward, where the mobile transceiver user wants to simply inform family or friends of the user's wellbeing. It will be appreciated that preferred embodiments of the present invention facilitate this type of straightforward contact in a number of different ways, e.g., by enabling the user to send a secure SMS message using relatively few keystrokes, and/or by suggesting, to the user who has tried and failed to make voice contact, to send a regular or a secure SMS message.

For example, if user 20 (FIG. 1) is in a region where a disaster, such as an earthquake or a terrorist attack, has occurred, the user may send a secure SMS message saying "I'm OK," as described above with reference to FIG. 2 and/or FIG. 3. Alternatively, the operator of SMSC 18 may monitor voice calls which transceiver users are attempting to place from the region of the disaster, and may send a suggestion to users in the region to transmit a regular or a secure SMS message. The suggestion may be sent as a-general suggestion to substantially all users in the region, or to specific users who have attempted and failed to make voice contact. A location of a transmitting transceiver and/or a time of message transmission may be appended to any SMS message transmitted from the region.

It will be understood that user 20 may indicate to the SMSC 18 a nature of destination 22, such as if the destination comprises a facsimile machine or a landline telephone, in order to facilitate transfer of any SMS message to the destination. Such indication may be provided during the course of the process illustrated by FIG. 2, and/or prior to implementation of the process.

It will also be understood that destination 22 may comprise more than one specific destination, such as a group of family members and/or associates of user 20. In the case that destination 22 does comprise more than one specific destination, user 20 may indicate that the SMS message is broadcast to all such destinations, or is transmitted in sequence to each destination until one of the destinations receives the SMS message.

Figure 4:
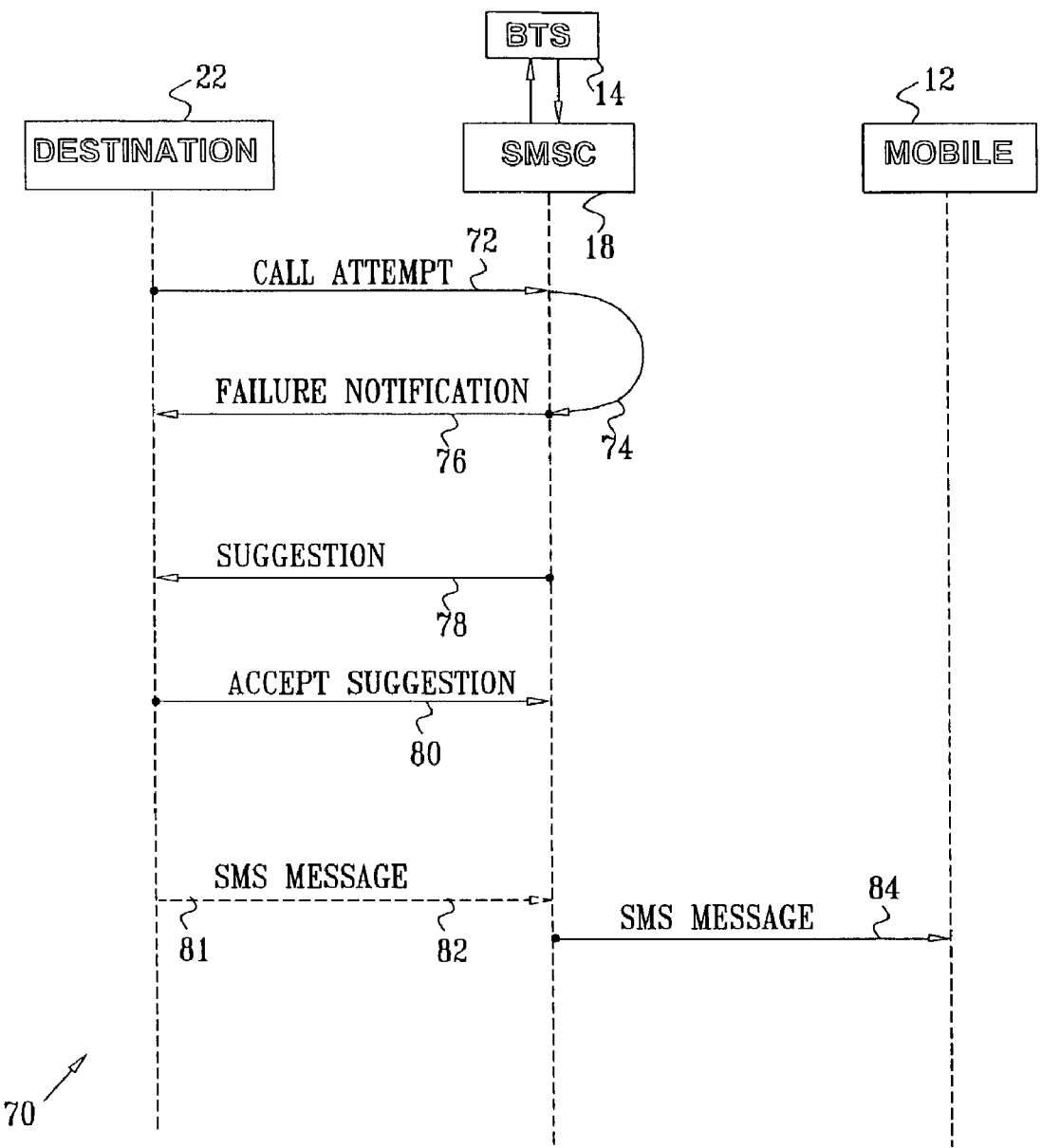
FIG. 4 is a sequence diagram showing steps involved in transmitting an SMS message, according to an alternative preferred embodiment of the present invention.

FIG. 4 is a sequence diagram 70 showing steps involved in transmitting an SMS message, according to an alternative preferred embodiment of the present invention. The steps comprised in diagram 70 occur, for example, when an attempt is made to make a call to mobile transceiver 12 (FIG. 1) and the transceiver is unable to receive the call because of congestion on voice channels in the region of the transceiver. Hereinbelow, by way of example, destination 22 is assumed to act as an originator of the call, which is assumed to comprise a voice call.

In a first step, destination 22 attempts, in a call setup attempt signal 72, to establish a regular voice call to mobile transceiver 12. The call attempt is received by BTS 14, which attempts and fails to place the call, as indicated by arrow 74. BTS 14 is preferably in direct communication with transceiver 12. Alternatively, BTS 14 is not in direct communication with transceiver 12, but has been informed by network 16 that there is congestion, or a high probability of congestion, in traffic to transceiver 12. For example, network 16 may provide such information by monitoring traffic statistics in different regions of the network, and/or by an operator of network 16 becoming aware of an event that could affect traffic, such as a natural disaster or a terrorist attack in the region of the transceiver.

In a second step, BTS 14 sends destination 22 a notification signal 76 that the call setup has failed, and also notifies SMSC 18 of the failure. The notifications may be provided via backbone 13 and mobile switching center 15.

In a third step, SMSC 18 or the operator monitoring the SMSC sends a suggestion signal 78 to destination 22, suggesting that a user of destination 22 sends an SMS message. Most preferably, the suggestion signal is of a form suited to destination 22. For example, if destination 22 comprises a landline phone, the suggestion signal may be a preset voice message suggesting that SMSC 18 sends an SMS message on behalf of destination 22. Alternatively, if destination 22 comprises a mobile telephone capable of receiving an SMS message, suggestion signal 78 may be a text message suggesting that destination 22 transmits an SMS message which SMSC 18 relays to transceiver 12.

In a fourth step, destination 22 accepts the suggestion, using an accept-suggestion signal 80 to SMSC 18, whereupon the SMSC sends an SMS message 84 to transceiver 12. SMS message 84 is preferably chosen by the user of destination 22 from a group of pre-set messages provided by SMSC 18, such as "Are you OK?" or "Please call home." Optionally, an identifier of the user is added to the SMS message, either automatically or via intervention of the operator of SMSC 18. Similarly, a time at which the message was sent may be appended.

Alternatively, if destination 22 is implemented to transmit SMS messages, it responds to suggestion signal 78 by transmitting an SMS message 82 to SMSC 18, as indicated by a broken line 81. SMSC 18 then conveys the message to transceiver 12 as SMS message 84.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for sending a secure message within a communications network which operates a short message service (SMS) according to an SMS protocol, comprising:

attempting to set up a voice communication from a mobile transceiver;

receiving a suggestion to transmit an SMS message from an SMS receiver at a mobile transceiver, responsive to the attempt to set up the voice communication;

transmitting an SMS message of a predefined type from a mobile transceiver over the network;

receiving the SMS message at an SMS receiver;

transmitting an authorization request, responsive to the SMS message and the predefined type, from the SMS receiver to the mobile transceiver;

receiving the authorization request at the mobile transceiver;

transmitting a pre-determined confirmation code from the mobile transceiver responsive to the authorization request; and forwarding the SMS message from the SMS receiver to a message destination responsive to receipt of the confirmation code at the SMS receiver.

2. A method according to claim 1, wherein the communications network comprises a cellular communication network.

3. A method according to claim 1, wherein the SMS message of the predefined type comprises one of a regular SMS message transmitted according to the SMS protocol, and a secure SMS message transmitted according to the SMS protocol after the secure SMS message has been validated.

4. A method according to claim 1, wherein forwarding the SMS message to the message destination comprises conveying the SMS message to the message destination as an SMS message.

5. A method according to claim 1, wherein forwarding the SMS message to the message destination comprises translating the SMS message to speech in a text-to-speech translator, and conveying the translated SMS message to the message destination as a voice communication.

6. A method according to claim 1, wherein the SMS message comprises a text message composed by a user of the mobile transceiver.

7. A method according to claim 6, wherein the text message is pre-stored by the user in a memory of the transceiver, and wherein transmitting the SMS message comprises recovering the text message from the memory.

8. A method according to claim 6, wherein the text message is pre-stored by the user in the SMS receiver, and wherein transmitting the SMS message comprises transmitting a pre-determined code from the mobile transceiver to the SMS receiver.

9. A method according to claim 1, wherein transmitting the SMS message comprises transmitting a pre-determined code indicative that the predetermined type comprises a secure SMS message.

10. A method according to claim 1, wherein forwarding the SMS message comprises transmitting a receipt request to the message destination.

11. A method according to claim 10, and comprising receiving the receipt request at the message destination and, responsive thereto, transmitting a receipt confirmation signal from the message destination to the mobile transceiver via the SMS receiver.

12. A method according to claim 1, and comprising receiving a notification of a failure of the voice communication at the mobile transceiver from the SMS receiver, responsive to attempting to set up the voice communication.

13. A method according to claim 1, wherein the suggestion is generated by an operator of the SMS receiver.

14. A method according to claim 1, and comprising an operator of the SMS receiver transmitting a pre-determined SMS message to the message destination responsive to a failure of the attempt to set up the voice communication.

15. A method according to claim 1, wherein transmitting the SMS message comprises transmitting the message via a common channel of the communications network.

16. A method according to claim 1, wherein the communications network comprises a cellular network operating according to a code division multiple access (CDMA) protocol, and wherein the SMS message is transmitted as a data burst message having a pre-determined code characteristic of the SMS message.

17. A method according to claim 1, and comprising appending at least one of a time of transmission and a location of the mobile transceiver to the SMS message.

18. A method according to claim 1, wherein the message destination comprises at least one destination chosen from a group comprising an SMS capable cellular telephone, a landline telephone, a session initiation protocol (SIP) telephone, a computer terminal, and a facsimile machine, and wherein the SMS receiver operates a protocol which is adapted to translate the SMS message so that the destination receives the message.

19. A method according to claim 1, wherein the message destination comprises a plurality of specific destinations, and wherein forwarding the SMS message comprises broadcasting the SMS message to the plurality of destinations.

20. A method according to claim 1, wherein the message destination comprises a plurality of specific destinations, and wherein forwarding the SMS message comprises transmitting the SMS message to at least one of the plurality of destinations in sequence.

21. A method according to claim 1, and comprising altering a balance between common channels and dedicated channels operative in the network so as to increase a probability of successful transmission of the SMS message.

22. Apparatus for sending a secure message within a communications network which is adapted to operate a short message service (SMS) according to an SMS protocol, comprising:

a mobile transceiver, which is adapted for attempting to set up a voice communication and which is adapted to transmit an SMS message of a predefined type over the network;

an SMS receiver adapted to transmit a suggestion to transmit an SMS message to a mobile transceiver, responsive to an attempt to set up a voice communication and which receives the SMS message and transmits an authorization request, responsive to the SMS message and the predefined type, to the mobile transceiver, so that the mobile transceiver is activated to transmit a predetermined confirmation code responsive to receipt of the authorization request, and so that the SMS receiver forwards the SMS message to a message destination responsive to receipt of the confirmation code at the SMS receiver.

23. Apparatus according to claim 22, wherein the communications network comprises a cellular communication network.

24. Apparatus according to claim 22, wherein the SMS message of the predefined type comprises one of a regular SMS message transmitted according to the SMS protocol, and a secure SMS message transmitted according to the SMS protocol after the secure SMS message has been validated.

25. Apparatus according to claim 22, wherein forwarding the SMS message to the message destination comprises conveying the SMS message to the message destination as an SMS message.

26. Apparatus according to claim 22, wherein the SMS receiver comprises a text-to-speech translator, and wherein the SMS receiver forwards the SMS message to the message destination as a translated voice communication.

27. Apparatus according to claim 22, wherein the SMS message comprises a text message composed by a user of the mobile transceiver.

28. Apparatus according to claim 27, wherein the mobile transceiver comprises a memory, and wherein the text message is pre-stored by the user in the memory, and wherein transmitting the SMS message comprises recovering the text message from the memory.

29. Apparatus according to claim 27, wherein the SMS receiver is adapted to pre-store the text message, and wherein transmitting the SMS message comprises transmitting a pre-determined code from the mobile transceiver to the SMS receiver.

30. Apparatus according to claim 22, the mobile transceiver is adapted to transmit a pre-determined code indicative that the predetermined type comprises a secure SMS message.

31. Apparatus according to claim 22, wherein forwarding the SMS message comprises transmitting a receipt request to the message destination.

32. Apparatus according to claim 22, and comprising receiving the receipt request at the message destination and, responsive thereto, transmitting a receipt confirmation signal from the message destination to the mobile transceiver via the SMS receiver.

33. Apparatus according to claim 22, wherein the SMS receiver is adapted to transmit a notification of a failure of the voice communication to the mobile receiver, responsive to the attempt to set up the voice communication.

34. Apparatus according to claim 22, wherein the suggestion is generated by an operator of the SMS receiver.

35. Apparatus according to claim 22, and comprising an operator of the SMS receiver transmitting a pre-determined SMS message to the message destination responsive to a failure of the attempt to set up the voice communication.

36. Apparatus according to claim 22, wherein the mobile transceiver is adapted to transmit the SMS message via a common channel of the communications network.

37. Apparatus according to claim 22, wherein the communications network comprises a cellular network operating according to a code division multiple access (CDMA) protocol, and wherein the SMS message is transmitted as a data burst message having a pre-determined code characteristic of the SMS message.

38. Apparatus according to claim 22, wherein the SMS receiver is adapted to append at least one of a time of transmission and a location of the mobile transceiver to the SMS message.

39. Apparatus according to claim 22, wherein the message destination comprises at least one destination chosen from a group comprising an SMS capable cellular telephone, a landline telephone, a session initiation protocol (SIP) telephone, a computer terminal, and a facsimile machine, and wherein the SMS receiver operates a protocol which is adapted to translate the SMS message so that the destination receives the message.

40. Apparatus according to claim 22, wherein the message destination comprises a plurality of specific destinations, and wherein forwarding the SMS message comprises broadcasting the SMS message to the plurality of destinations.

41. Apparatus according to claim 22, wherein the message destination comprises a plurality of specific destinations, and wherein forwarding the SMS message comprises transmitting the SMS message to at least one of the plurality of destinations in sequence.

42. Apparatus according to claim 22, wherein the SMS receiver is adapted to alter a balance between common channels and dedicated channels operative in the network so as to increase a probability of successful transmission of the SMS message.

43. A method for sending a secure message within a communications network which operates a short message service (SMS) according to an SMS protocol, comprising:

attempting to set up a voice communication from a mobile transceiver;

receiving a suggestion to transmit an SMS message from an SMS receiver at a mobile transceiver, responsive to the attempt to set up the voice communication;

transmitting an SMS message of a predefined type from a mobile transceiver over the network;

receiving the SMS message at an SMS receiver;

transmitting an authorization request, responsive to the SMS message and the predefined type, from the SMS receiver to the mobile transceiver;

identifying a failure to respond to the authorization request; and forwarding the SMS message from the SMS receiver to a message destination responsive to the failure.

44. A method according to claim 43, and comprising appending a notification to the SMS message that the message is unverified.

45. Apparatus for sending a secure message within a communications network which is adapted to operate a short message service (SMS) according to an SMS protocol, comprising:

a mobile transceiver, which is adapted for attempting to set up a voice communication and which is adapted to transmit an SMS message of a predefined type over the network; and an SMS receiver, which is adapted to:

transmit a suggestion to transmit an SMS message to a mobile transceiver, responsive to an attempt to set up a voice communication, receive the SMS message and transmit an authorization request, responsive to the SMS message and the predefined type, to the mobile transceiver, identify a failure to respond to the authorization request, and forward the SMS message to a message destination responsive to the failure.

46. Apparatus according to claim 45, wherein the SMS receiver is adapted to append a notification to the SMS message that the message is unverified.

* * * * *